United States Patent [19]
Keller

[11] Patent Number: 5,248,441
[45] Date of Patent: Sep. 28, 1993

[54] PROCESS FOR THE RECOVERY OF COPPER FROM COPPER-CONTAINING INDUSTRIAL WASTE WATERS

[75] Inventor: Markus Keller, Arlesheim, Switzerland

[73] Assignee: Sandoz Ltd., Basel, Switzerland

[21] Appl. No.: 795,346

[22] Filed: Nov. 20, 1991

[30] Foreign Application Priority Data

Nov. 22, 1990 [DE] Fed. Rep. of Germany ....... 4037149

[51] Int. Cl.$^5$ ............................................. C02F 1/62
[52] U.S. Cl. ..................... 210/719; 210/724; 210/726; 210/737; 210/912; 423/43
[58] Field of Search ............... 210/719, 724, 726, 737, 210/912; 423/34, 42, 43

[56] References Cited

U.S. PATENT DOCUMENTS

| | | | |
|---|---|---|---|
| 3,784,669 | 1/1974 | Elges et al. | 423/43 |
| 4,218,219 | 8/1980 | Nagl et al. | 8/652 |
| 4,686,285 | 8/1987 | Pedrazzi | 162/162 |
| 5,133,873 | 7/1992 | Catlin et al. | 210/719 |

FOREIGN PATENT DOCUMENTS

| | | |
|---|---|---|
| 2122415 | 11/1972 | Fed. Rep. of Germany . |
| 2242473 | 10/1973 | Fed. Rep. of Germany . |
| 2930110 | 2/1981 | Fed. Rep. of Germany . |
| 230566 | 12/1985 | Fed. Rep. of Germany . |
| 256528 | 5/1988 | Fed. Rep. of Germany . |
| 62129371 | 11/1985 | Japan . |
| 1195217 | 6/1970 | United Kingdom . |

OTHER PUBLICATIONS

ORBIT-Derwent WPAT Database printout dated 11 Apr. 1992-english language abstracts of: DD-PS 256528; DD-PS 230566; JP 62129371 DE OS 2122415, DE OS 2930110, DE OS 2242473.

*Primary Examiner*—Peter Hruskoci
*Attorney, Agent, or Firm*—Robert S. Honor; Richard E. Vila; Andrew N. Parfomak

[57] ABSTRACT

Process for the recovery of copper from copper-containing industrial waste waters, in which the ionogenic copper or the copper in complex form is firstly reduced with sugar, then with dithionite, and is separated in metallic form.

9 Claims, No Drawings

PROCESS FOR THE RECOVERY OF COPPER FROM COPPER-CONTAINING INDUSTRIAL WASTE WATERS

During the production, in particular of copper complex dyes, the resulting industrial waste waters often have a copper content which is too high for them to be channeled in public waste water plants. Frequently, part of the copper present exists in complex-bound form, e.g., as residual copper complex dyes, so that purification of the waste water cannot take place by the usual precipitation reactions.

According to the invention there is provided a process for removing ionogenic and complex-bound copper from an aqueous copper-containing liquor, preferably from industrial waste water, by treating the liquor
  (1) at a pH of between 10 and 12, with a reducing sugar in an amount of at least four times by weight the amount of copper (based on pure metal) present in the liquor in a sufficient time to result in de-complexation of substantially all of the copper complexes,
  (2) treating with hydrosulphite (e.g., alkali metal or ammonium dithionite) in an amount 0.5–4 times (preferably 2.5-3 times) the amount by weight (based on the weight of copper present) in the liquor followed by,
  (3) neutralizing the reaction mixture with acid, and
  (4) separating out the precipitated copper so as to give a liquor preferably having less than 10 ppm. of copper present.

By de-complexation is meant breaking down or dissociation or decomposition of the complex-bound copper to substantially release copper from the complex.

In this process, it is advantageous first to heat the waste water to be treated to 40°–100° C., preferably to about 60° C., after which a pH of 11.0 to 11.2 is set with a base, e.g., sodium hydroxide. The sugar, preferably glucose (monohydrate), is added while stirring continuously at 60° C. and maintaining the pH at 11–11.2, for 5-60 mins. until the colour of the reaction mixture is a pale yellow to brown. It may be necessary to add further sugar to achieve this change after which hydrosulphite (e.g., dithionite) is added. It may be advantageous to displace the air over the reaction mixture prior to reduction with sugar or hydrosulphite in the reaction vessel with an inert gas, preferably nitrogen, while stirring continuously for ca. 20 minutes at 60° C. The pH is adjusted to about 7.0 to 8 with (preferably 30%) hydrochloric acid, whereby the temperature generally increases slightly and the copper is precipitated. After stirring for a further ten minutes, the copper content of the liquid is reduced to <10 ppm. To separate out the copper more easily, filtering earth is stirred in (about one third of the amount by weight of the sodium dithionite) and the undissolved residue is filtered off.

The two reduction steps (namely the addition of sugar and the addition of hydrosulphite) can be followed by measuring the redox potential. In the first step, the potential falls from ca. $-200$ mV to ca. $-650$ mV and in the second step to ca. $-800$ mV.

In general, after production of the copper complex dyestuffs, the mother liquors contain about 300–1500 mg/l copper based on the amount of pure metal present. This type of mother liquor is most suitable for the decoppering process according to the invention. However, waste waters containing up to 5000 mg/l copper can also be treated according to the invention. The process is especially suitable for only moderately acidic to slightly alkaline waste waters, since in this case only a small amount of neutralizing alkali is required.

In the following example, the parts and percentages are by weight. The temperatures are given in degrees Celsius.

EXAMPLE 1000 parts of copper-containing mother liquor from azo dyestuff production with a copper content of 1000 ppm are heated with direct steam to 60°. The liquor is set at pH 11.0 to 11.2 with 30% sodium hydroxide, reacted whilst stirring with 4.7 parts of glucose monohydrate, and stirred until a spot test indicates a colour of the reaction mixture from a pale yellow to brown (ca. 30 minutes). The temperature is maintained at 60° C. and the pH is maintained at 11.0 to 11.2 using dilute sodium hydroxide. Then, whilst passing nitrogen through the reaction vessel, 2.7 parts of sodium dithionite are added, and stirring is effected for 15 minutes. After 20 minutes, neutralization is carried out using 30% HCl (pH 7.0 to 7.2), whereby acid is added to reduce the pH below 7.0. The copper content of the solution now drops to <10 ppm. 1.0 part of filtering earth is added to the mixture, which is stirred for another 5 minutes and filtered. The residue, a moist presscake consists of about 55% water and 15% each of copper, filtering earth and other undefined solids.

What is claimed is:
1. A process for the recovery of copper from a liquor containing copper dye complexes comprising the steps of:
  (a) treating the liquor at a pH of between 10 and 12 with a reducing sugar in an amount of at least four times by weight the amount of copper based on the weight of pure metal present in the liquor to result in de-complexation of substantially all the copper complexes,
  (b) treating the resulting mixtures with hydrosulphite in an amount of 0.5-4 times the amount by weight of copper in the mixture, followed by
  (c) neutralizing the mixture with acid to form a copper precipitate, and
  (d) separating out the precipitated copper.
2. A process according to claim 1 in which the resultant mixture has less than 10 ppm. of copper present.
3. A process according to claim 1 in which the hydrosulphite is alkali metal or ammonium dithionite.
4. A process according to claim 1 wherein the reducing sugar is glucose monohydrate.
5. A process according to claim 1, in which the liquor is a mother liquor resulting from the production of copper complex dyestuffs.
6. A process according to claim 1 in which the initial pH is set at 11.0 to 11.2 prior to addition of sugar and the pH after the addition of hydrosulphite is set to 7.0 to 7.2 by the addition of acid.
7. A process according to claim 6 in which the hydrosulphite is alkali metal or ammonium dithionite.
8. A process according to claim 1 which the temperature of the liquor treated is from 40°–100° C.
9. A process for the recovery of copper from copper-containing liquor containing copper dye complexes comprising the steps of:
  (a) treating the liquor at a temperature between 40° and 100° C. and a pH of 11.0 to 11.2 with a reducing sugar comprising glucose monohydrate in an amount of at least four times by weight the amount of copper based on the pure metal present in the liquor to a time sufficient to result in de-complexation of substantially all the copper complexes, (b) treating the resulting mixture with a hydrosulphite selected from alkali metal and ammonium dithionite in an amount 2.5-3 times the amount by weight of copper in the mixture, followed by (c) neutralizing the mixture with acid to form a copper precipitate, and (d) separating out the precipitated copper.

* * * * *